(12) United States Patent   (10) Patent No.: US 7,529,004 B2
Debevec et al.   (45) Date of Patent: May 5, 2009

(54) COLOR MATCHING IN LIGHTING REPRODUCTION SYSTEMS

(75) Inventors: Paul E. Debevec, Los Angeles, CA (US); Timothy S. Hawkins, Los Angeles, CA (US); Andreas Wenger, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 647 days.

(21) Appl. No.: 10/869,990

(22) Filed: Jun. 17, 2004

(65) Prior Publication Data

US 2005/0018223 A1    Jan. 27, 2005

Related U.S. Application Data

(60) Provisional application No. 60/479,535, filed on Jun. 18, 2003.

(51) Int. Cl.
*H04N 1/46* (2006.01)
*G06F 15/00* (2006.01)
*G03B 9/70* (2006.01)

(52) U.S. Cl. .................. 358/509; 358/1.9; 358/514; 396/166

(58) Field of Classification Search .......... 358/1.9, 358/509, 510, 512, 514, 515, 518, 520; 396/155, 396/164, 166, 168, 221
See application file for complete search history.

(56) References Cited

U.S. PATENT DOCUMENTS

| | | | | |
|---|---|---|---|---|
| 5,710,876 | A * | 1/1998 | Peercy et al. | 345/426 |
| 5,761,070 | A * | 6/1998 | Conners et al. | 700/223 |
| 6,142,629 | A * | 11/2000 | Adel et al. | 351/206 |
| 6,379,022 | B1 * | 4/2002 | Amerson et al. | 362/231 |
| 6,577,395 | B1 * | 6/2003 | Berns et al. | 356/402 |
| 6,778,290 | B2 * | 8/2004 | Oehlbeck et al. | 358/1.15 |
| 6,934,053 | B1 * | 8/2005 | Mestha et al. | 358/1.9 |
| 6,954,547 | B2 * | 10/2005 | Matsushiro et al. | 382/162 |
| 7,230,738 | B2 * | 6/2007 | Zhang et al. | 358/1.9 |
| 2002/0001080 | A1 * | 1/2002 | Miller et al. | 356/326 |
| 2002/0030862 | A1 * | 3/2002 | Tabata et al. | 358/509 |
| 2002/0135828 | A1 * | 9/2002 | Shirochi et al. | 358/521 |
| 2003/0189736 | A1 * | 10/2003 | Ikeda | 358/475 |
| 2004/0141213 | A1 * | 7/2004 | Kleiman | 358/474 |
| 2004/0208385 | A1 * | 10/2004 | Jiang | 382/254 |
| 2004/0218183 | A1 * | 11/2004 | Wilsher et al. | 356/402 |
| 2006/0012987 | A9 * | 1/2006 | Ducharme et al. | 362/231 |
| 2007/0115665 | A1 * | 5/2007 | Mueller et al. | 362/276 |

* cited by examiner

*Primary Examiner*—Madeleine A Nguyen
(74) *Attorney, Agent, or Firm*—McDermott Will & Emery LLP

(57) ABSTRACT

A lighting reproduction apparatus for illuminating a subject includes a reproduction light optical source that generates reproduction light. The optical source includes a plurality of light emitters, each characterized by an individual color channel. There may be nine different color channels. A driver drives the light emitter color channels with intensity values at which a substantial spectral match is achieved between the reproduction light and the desired illuminant, so that the subject appears to be illuminated by the desired illuminant. These channel intensity values may be determined by solving a minimization equation that minimizes a sum of square residuals of the reproduction light spectra to the desired illuminant spectra. The output reproduction light may be metamerically matched with the desired illuminant, with respect to a particular camera's spectral response. One or more spectral reflectances of the subject may be measured and incorporated into the optimization process.

35 Claims, 15 Drawing Sheets

COLOR MATCHING IN LIGHTING REPRODUCTION SYSTEMS

CROSS REFERENCE TO RELATED APPLICATIONS

This application claims the benefit of priority under 35 U.S.C. §119(e) from commonly owned U.S. provisional patent application, Ser. No. 60/479,535, filed on Jun. 18, 2003, entitled "Method and Apparatus for Optimizing Color Matching in a Lighting Reproduction System." The entire content of this provisional application is incorporated herein by reference.

BACKGROUND

Lighting reproduction typically involves using computer-controlled light sources to illuminate a real-world subject as it would appear within a particular real-world environment. The light sources, which may be aimed toward the subject from many directions, can be driven to various intensities and colors to best approximate the illumination within the real-world environment. One application for this technique is to realistically composite the subject into a scene, for example to composite an actor in a studio into a faraway location such as a cathedral. When the actor is illuminated by a close approximation of the lighting originally present in the cathedral, then such a composite may believably show the actor standing within the cathedral.

One challenge in lighting reproduction is that real-world illumination and subjects tend to have complex spectral properties, because lighting and reflectance are functions of wavelength across the visible spectrum, often with significant variations. In contrast, the light sources in lighting reproduction systems typically use only three channels of illumination color, i.e. the conventional red, green, and blue (RGB) channels, which can be produced by appropriately colored LEDs (light emitting diodes). Although RGB colors are commonly used in computer graphics, it may be difficult to accurately compute the color of light reflecting from a surface of a subject without knowing the spectrum of the illuminant and the spectral reflectance of the subject surface. When the illuminant spectrum and the spectral reflectance of the subject surface are not taken into account, it may be hard to accurately reproduce the subject's appearance under complex real-world illumination spectra such as tungsten and fluorescent lighting using just RGB lights.

Accordingly, there is a need for improved color matching techniques in lighting reproduction systems.

SUMMARY

A number of techniques may be implemented in order to improve color matching in a lighting reproduction process. The light emitter color channels of an LED-based reproduction light source, which in one embodiment includes more than 3 channels, may be driven with intensity values that have been determined to produce an optimal spectral match with the desired illuminant spectrum. A constrained minimization equation may be solved, in order to determine these optimal values for the intensities of the light emitter color channels.

An apparatus for illuminating a subject may include an optical source configured to generate reproduction light that illuminates the subject. The optical source may include a plurality of light emitters, and each light emitter may be characterized by an individual color channel having an associated spectral power distribution. In one embodiment, the light emitter color channels may include more than 3 different color channels.

The apparatus may include a driver configured to drive the light emitter color channels with channel intensity values at which a substantial spectral match is achieved between the reproduction light and a desired illuminant having a known spectral power distribution, so that the subject appears to be illuminated by the desired illuminant.

The optimal channel intensity values may be determined by solving a minimization equation that minimizes the sum of the square residuals between the reproduction light spectra and the desired illuminant spectra.

In some embodiments, a metameric match may be achieved, i.e. the reproduction light, as observed by a particular optical imaging system, may be matched to the desired illuminant, as observed by the same optical imaging system. The optical imaging system may be characterized by one or more spectral response functions, whose response functions may be measured, and incorporated into the minimization equation for determining the optimal channel intensity values. In some embodiments, the optical imaging system is the human visual system, and the response functions used are spectral response functions characteristic of the three types of cones in the human eye, i.e. of the light-sensitive cells in the human retina.

In some embodiments, one or more dominant reflectances of the subject may be measured, and may be made part of the optimization process. In this embodiment, the appearance of the subject under the reproduced illumination may be matched to the actual or computed appearance of the subject under the desired illumination, again with respect to the spectral response of a particular camera system.

BRIEF DESCRIPTION OF THE DRAWINGS

FIG. 4A shows the spectral power distributions of the individual channels of the 3-channel RGB light source, whereas

FIG. 8A uses a 3-channel light source, and uses tungsten as the desired illuminant. FIG. 8B uses a 9-channel light source, and uses tungsten as the desired illuminant. FIG. 8C uses a 3-channel light source, and uses fluorescent light as the desired illuminant. FIG. 8D uses a 9-channel light source, and uses fluorescent light as the desired illuminant.

DETAILED DESCRIPTION

A method and apparatus is described for improving color matching in lighting reproduction systems. The SIM (Spectral Illuminant Matching) technique is described, in which the LED spectral channels are driven so as to optimally match the spectra of the desired illuminant. The MIM (Metameric Illuminant Matching) technique is described, in which the spectral response of the camera is measured, and the LED spectral channels are driven so as to produce a metameric match with the desired illuminant, as seen by the camera, rather than a direct match with the desired illuminant spectra. The MRM (Metameric Reflectance Matching) technique is described, in which the dominant spectral reflectances of the subject are measured, in addition to the spectral response curves of the camera, and the LED spectral channels are driven so that the subject's reflection of the light from the LED-based optical source, as observed by the camera, is metameric to the subject's reflection of the desired illuminant, as observed by the camera. In one embodiment, an LED-based optical source is used that has more than the conventional 3 (red, green, and blue, or "RGB") spectral channels, for example has 9 spectral channels.

Figure 1:
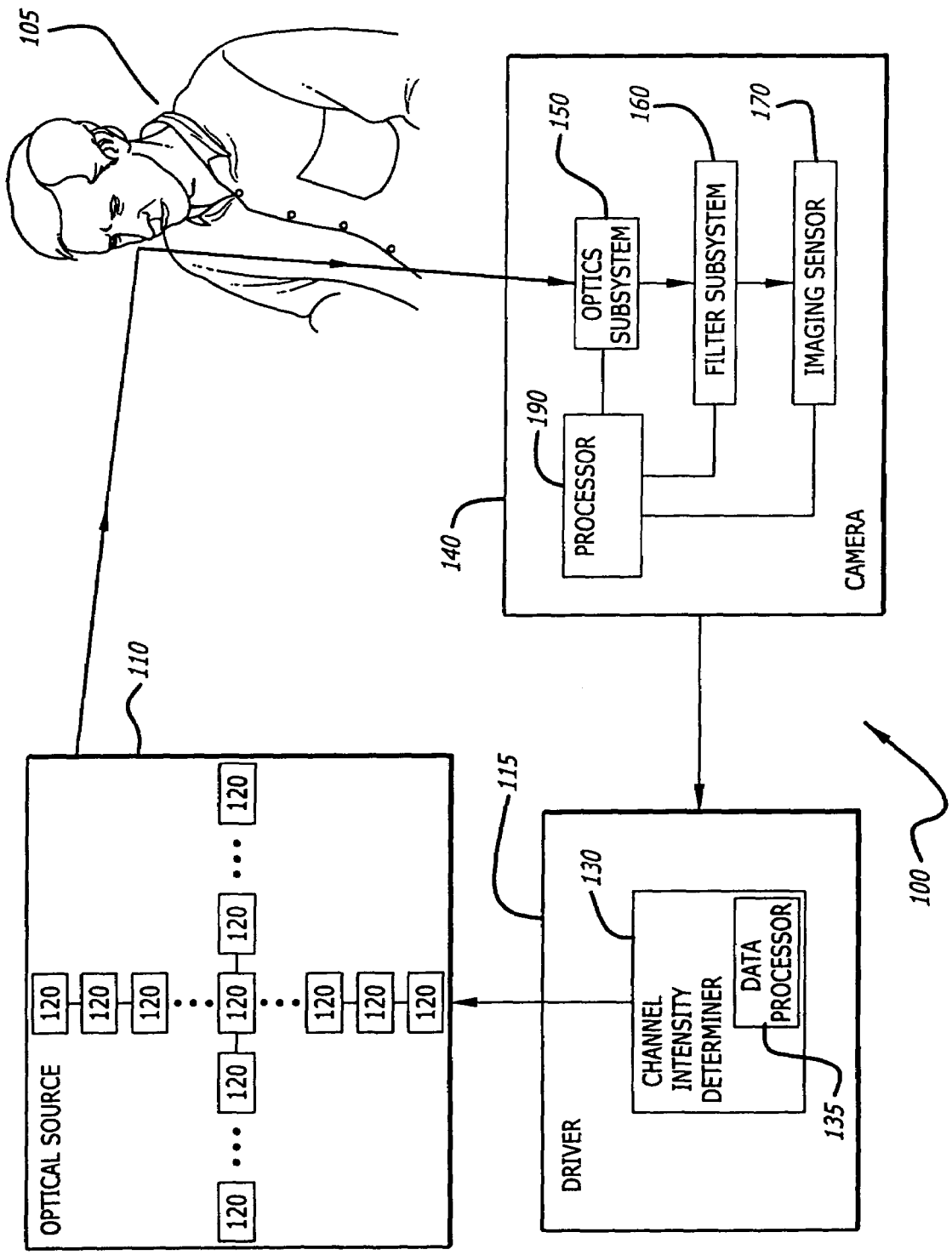
FIG. 1 is a schematic block diagram of a lighting reproduction apparatus that improves color matching, in accordance with one embodiment.

FIG. 1 is a schematic block diagram of an apparatus 100 that improves color matching, in accordance with one embodiment. In overview, the apparatus 100 includes an optical source 110, which generates light that illuminates a subject 105. In the illustrated embodiment, the subject 105 is a person; however, in other embodiments subjects other than persons may be used, including but not limited to inanimate objects and animals. In a lighting reproduction system, the light from the optical source 110 may be referred to as reproduction light. The optical source 110 includes a plurality of light emitters 120, each characterized by a single individual color channel, e.g. red (R), blue (B), or green (G). A driver 115 drives each of the light emitter color channels at appropriate intensities.

In embodiments in which a metameric match is sought, i.e. the desired illuminant spectrum as observed by particular optical imaging system is reproduced, rather than reproducing the original desired illuminant spectrum, the apparatus 100 includes an optical imaging system 140. The optical imaging system 140 detects the light generated by the optical source 110, after the subject 105 has been illuminated with the light from the optical source 110, and after the light has been reflected from the subject 105. The optical imaging system 140 generates image data representative of the spectral power distribution of the detected light.

The optical imaging system 140 may be a digital camera, and may be characterized by at least one spectral response function, one for each color channel of the camera. The optical imaging system 140 may include an optics subsystem 150 and a filter subsystem 160, through which the incoming light from the optical source 110 is processed. The optics subsystem 150 may include optics components known in the art, including but not limited to one or more of the following: reflectors, refractors, lenses, prisms, scatterers, splitters, and collimators. After the light from the optical source 110 is filtered by the filter subsystem 160, the light is directed to the imaging sensor 170. As known in the art, the imaging sensor 170 may be an array of sensor elements, which detect incident light and convert the incident light photons into output signals representative of the intensities and wavelengths of the incident photons. These output signals can be processed by a processor 190, which generates the image data representative of the spectral power distribution of the detected light.

In some embodiments, optical imaging systems other than a digital camera may be used. For example, in one embodiment the optical imaging system 140 may be the human visual system. In this embodiment, the imaging sensor 170 is the human retina, and the sensor elements are the cone cells in the human retina.

The driver 115 may include a channel intensity determiner 130, which computes the light emitter channel intensity values at which an optimal spectral match occurs between the reproduction light generated by the optical source 110, and the light generated by a desired illuminant having a known spectral power distribution. In some embodiments, e.g. in embodiments in which the MIM or the MRM techniques are used, the desired spectral match may be a metameric match with respect to a desired optical imaging system.

The channel intensity determine 130 may include a data processor 135, which is configured to input and store the data necessary to compute the optimal light emitter channel intensity values. These data may include, but is not limited to: the image data generated by the optical imaging system; illuminant data representative of the known spectral power distribution of the desired illuminant; light emitter data representative of the spectral power distributions of the individual color channels of the light emitters 120; spectral response data representative of the spectral response functions of the camera; and illuminant observation data representative of the spectral power distribution of the desired illuminant when observed by the camera 140. The data processor 135 may be configured to compute the optimal channel intensity values by minimizing a sum of square residuals of the image data to the illuminant data.

In one embodiment, the optical source 110 may be based on a plurality of computer-controllable light emitters 120. In one embodiment, the light emitters 120 may be LEDs; however, other embodiments may use light emitters other than LEDs, including but not limited to filtered incandescent light sources. Each light emitter color channel is characterized by an associated spectral power distribution $b_j(\lambda)$, where $b_j(\lambda)$ represents the intensity of the j-th light emitter at a wavelength $\lambda$. In one embodiment, a 3-channel RGB LED light source can be used. In another embodiment, a custom-built 9-channel light source can be used. Other embodiments may use LED-based light sources having a number of color channels other than 3 or 9.

Figure 2:
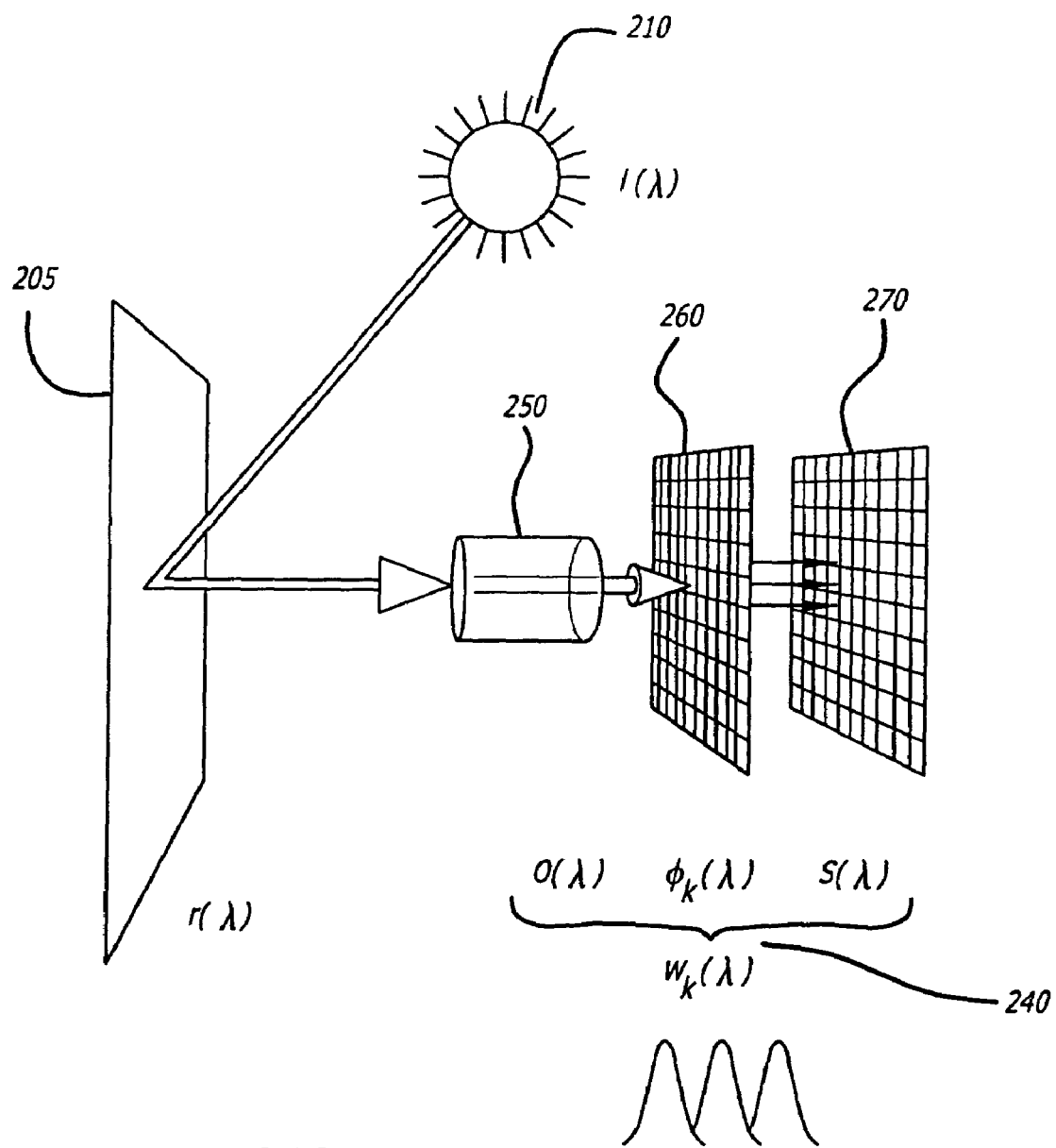
FIG. 2 schematically illustrates a spectral camera model, which describes how light is recorded by an optical imaging system.

FIG. 2 schematically illustrates a spectral camera model, which describes how light is recorded by an optical imaging system, in one embodiment. In general, in order to generate a color match for a specific observer with reproduced light, a model must be defined that describes how the observer senses light, and how the light is reproduced. In one embodiment, a spectral camera model is used, the components of which are shown in FIG. 2. The components includes a light source 210 for generating reproduction light; a surface 205 illustrating a surface of an observed subject, from which the reproduction light is reflected; and a camera system 240, which includes an optics subsystem 250, a filter subsystem 260, typically including a plurality of filters, and an imaging sensor 270.

The parameters of the spectral camera model, illustrated in FIG. 2, include the spectral power distribution of the light source 210, denoted by $l(\lambda)$; the spectral reflectance of the surface 205 of the observed subject, denoted by r(λ); the spectral properties of the optics subsystem 250, denoted by o(λ); the spectral transmittance of the kth filter of the filter subsystem 260, denoted by $\phi_k(\lambda)$; and the spectral sensitivity of the imaging sensor 270, denoted by s(λ) The camera system 240 is described by a spectral response function $w_k(\lambda)$=o(λ)·$\phi_k(\lambda)$·s (λ) which includes contributions from the optics subsystem 250, the filter subsystem 260, and the imaging sensor 270.

In one embodiment, the nonlinear response of the imaging sensor of the kth channel can be modeled using a function $\Gamma_k^c$. In this embodiment, the linear pixel values $c_k$ can be obtained by applying the inverse function of $\Gamma_k^c$ to the non-linear pixel values $\check{c}_k$. Observed pixel values are then determined by the following equation:

$$\check{c}_k = \Gamma_k^c\left(t_{int\,g} \cdot \int_{\lambda_{min}}^{\lambda_{max}} l(\lambda) \cdot r(\lambda) \cdot o(\lambda) \cdot \phi_k(\lambda) \cdot s(\lambda) d\lambda + \varepsilon_k\right) \quad (1)$$

$$c_k = \Gamma_k^{c-1}(\check{c}_k) \quad (2)$$

In the illustrated spectral camera model, $\varepsilon_k$ represents the camera noise of the kth channel, which is modeled as an additive noise, as shown in equation (1). Smaller pixel values $c_k$ are relatively much more affected by noise than larger pixel values. In equation (1) above, $t_{int\,g}$ represents the integration time, i.e. the shutter speed of the camera 240.

The spectral model for the reproduction light source 210 consists of a small number of positive valued functions $b_i(\lambda)$, which represent the spectral power distributions of the individual color channels of the light emitters that make up the light source 210, as described earlier. The final light output from the reproduction light source 210 is a weighted sum $\Sigma i \Gamma_k^l(p_i) b_i$ of these functions $b_i(\lambda)$. In this weighted sum, the weighting parameters $p_i$ can only take on non-negative values ($p_i \geq 0$). The nonnegativity constraint on the weights $p_i$ represents the inability of the light emitters to produce negative light. The function $\Gamma_k^l$ models the nonlinearity in the light output of the kth channel of the reproduction light source 210.

Figure 3:
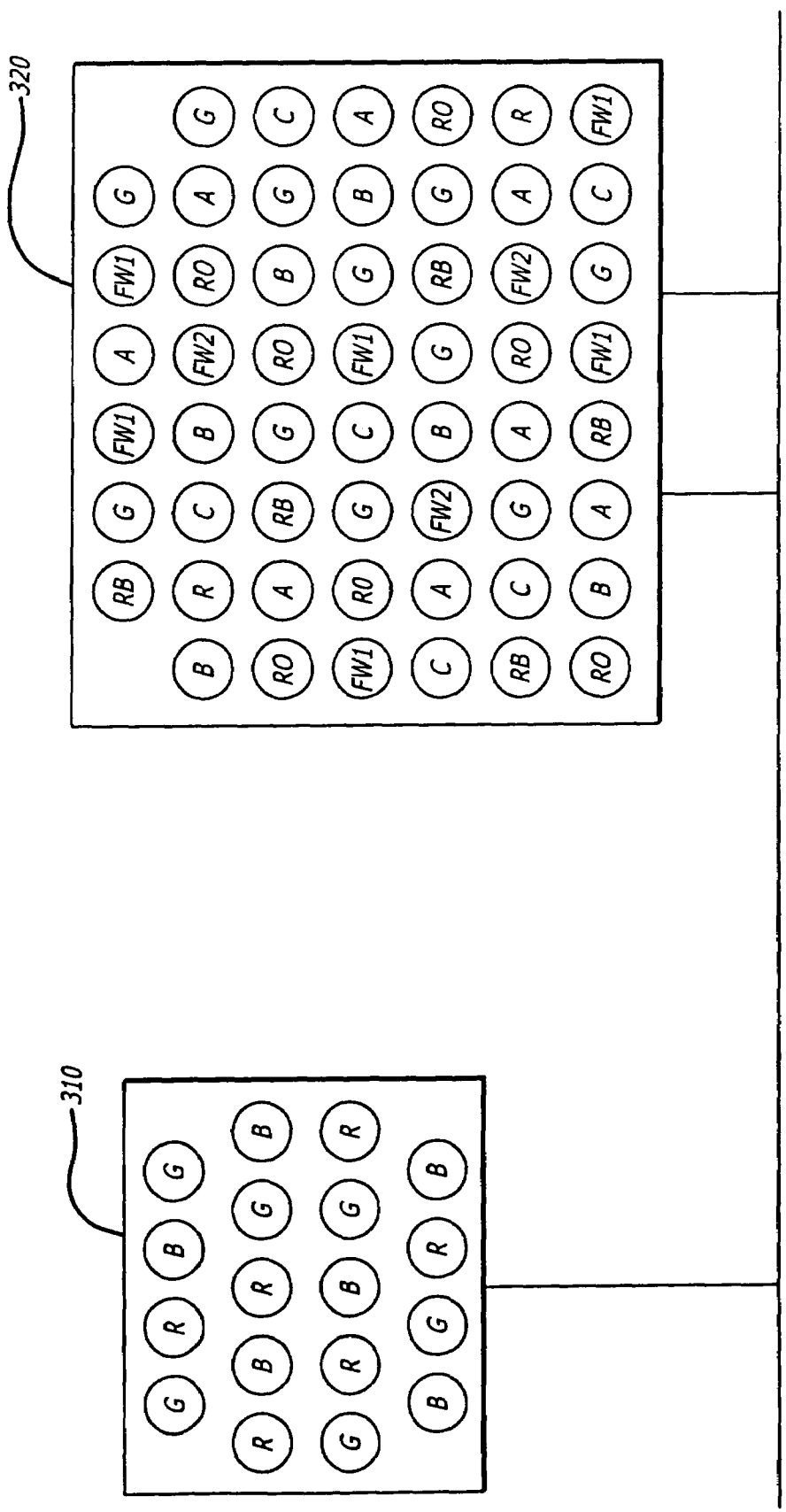
FIG. 3 schematically illustrates a 3-channel (RGB) light source 310, shown on the left, and a 9-channel light source 320, shown on the right. In the illustrated embodiment, the 3-channel RGB light source is a Color Kinetics Color-Blast 6, driven by a Color Kinetics PDS-150e power/data supply.

FIG. 3 schematically illustrates a 3-channel (RGB) light source 310, shown on the left, and a 9-channel light source 320, shown on the right. In the illustrated embodiment, the 3-channel RGB light source 310 is a Color Kinetics ColorBlast 6, driven by a Color Kinetics PDS-150e power/data supply. The 3-channel light source 310 includes a plurality of LEDs, each of which is characterized by a single individual color channel. Each color channel of each LED is either a red channel (indicated as R in item 310 of FIG. 3), a blue channel (indicated as B in item 310 of FIG. 3) or a green channel (indicated as G in item 310 of FIG. 3).

In one embodiment, the 9-channel multi-spectral light source 320 is a custom-built source based on three ColorBlast 6 light sources. The original ColorBlast 6 LEDs is replaced in the multi-spectral light source 320 with a wider range of LED colors, to obtain finer control over the spectral output of the light. In the illustrated embodiment, white, royal blue, blue, cyan, green, amber, red-orange and red Luxeon Star/O emitters from Lumileds have been used. The three ColorBlast 6 light sources provide 9 channels for the 8 differently colored LEDs.

In one embodiment, white LEDs are put in two of the channels, and gel filters are placed in front of the LED's optics, because only eight differently colored LEDs are used. In one embodiment, one white channel is covered with Lee filter #101 and the other channel is covered with Lee filter #104. The two slightly distinct yellow filters help fill a gap near 560 nm, not covered by the other LEDs. These filters also attenuate a pronounced spectral output of the white LEDs in the blue region of the spectrum, which is already covered by the blue and the royal blue LEDs. In general, filters can be used over any source illuminants in order to improve the spectral output of the illuminants for lighting reproduction. In the embodiment illustrated in FIG. 3, the final 9 channels are indicated in item 320 of FIG. 3 as follows: RB (for royal blue); B (for blue); C (for cyan); G (for green); FW1 (for filtered white 1); FW2 (for filtered white 2); A (for amber); RO (for red-orange); and R (for red).

Figure 4A:
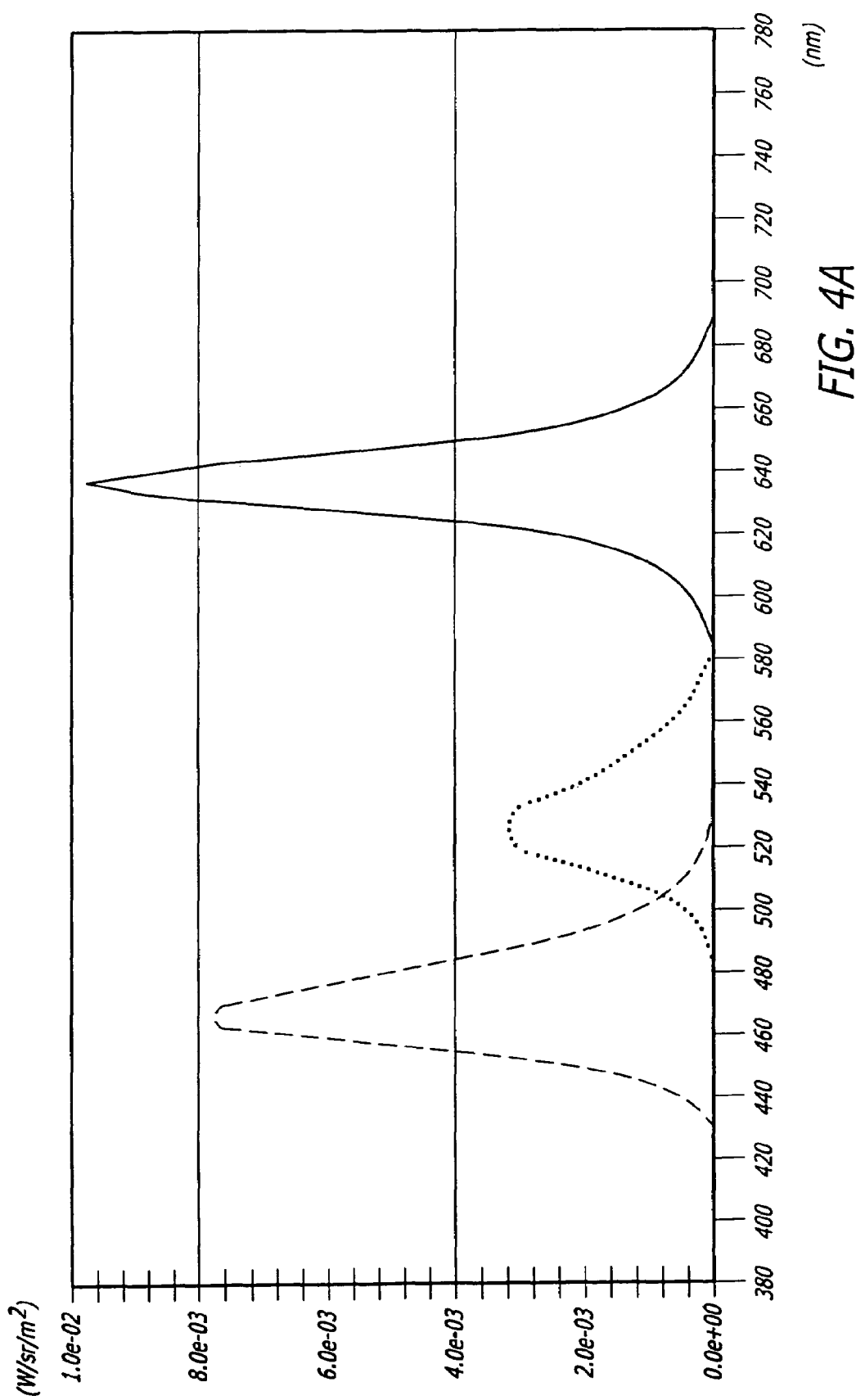
Figure 4B:
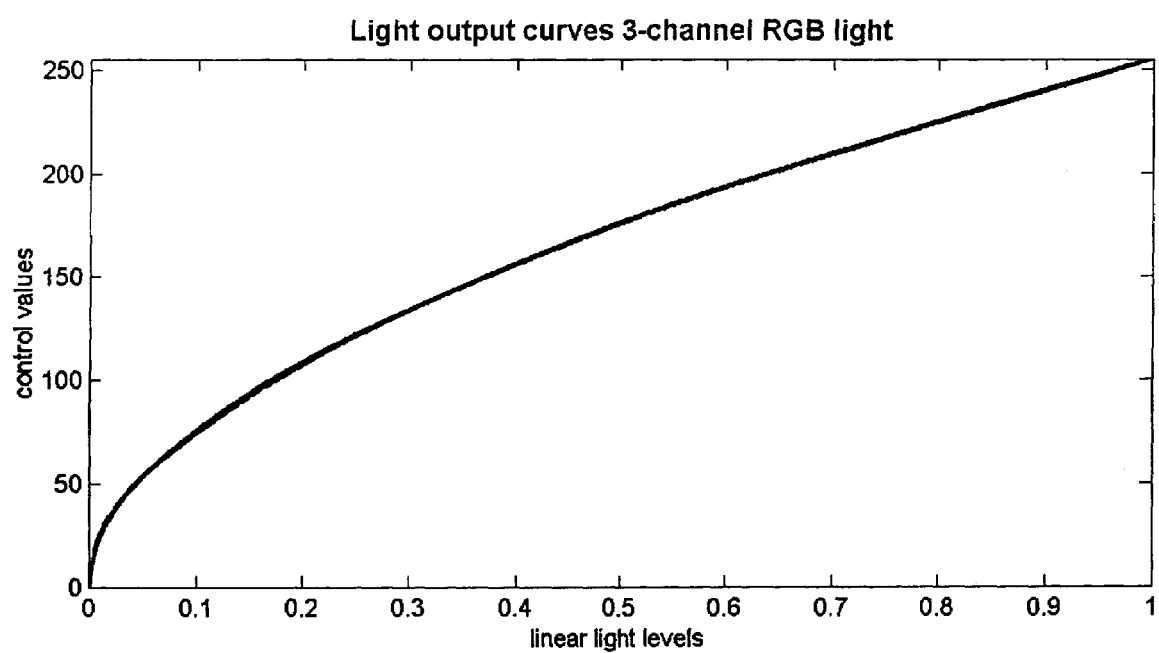
FIG. 4B shows the light output curves of the 3-channel light source.

FIG. 4A shows the spectral power distributions $b_i(\lambda)$ of the individual light emitter channels of the 3-channel RGB light source 310, while FIG. 4B shows the light output curves showing the final light output $\Sigma i \Gamma_k^l(p_i) b_i$ from the 3-channel light source 310. In FIG. 4A, the red channel is illustrated as a solid curve; the blue channel is illustrated as a dashed curve; and the green channel is illustrated as a dotted curve. FIG. 4A shows that the red, green, and blue spectral power distributions leave a significant gap between green and red, where there is no light output. The wide gap between the red and the green channel shows that the light source 310 generates very little light in the yellow part of the spectrum between 560 nm and 600 nm. The gap between the green and blue channels is far less pronounced.

FIG. 4B illustrates the measured light output curves for each of the 3 channels of the 3-channel light source 310, showing the non-linear behavior of the RGB light source 310. The light output curve $\Gamma_k^l$ of the reproduction light's kth channel is recovered by sending increasing values to the light source 210 and measuring the intensity output with the PR-650. These output curves allow the light's nonlinear intensity output behavior to be compensated. In FIG. 4B, it is seen that all the light output curves of the 3-channel light source exhibit a very similar non-linear behavior.

Figure 5A:
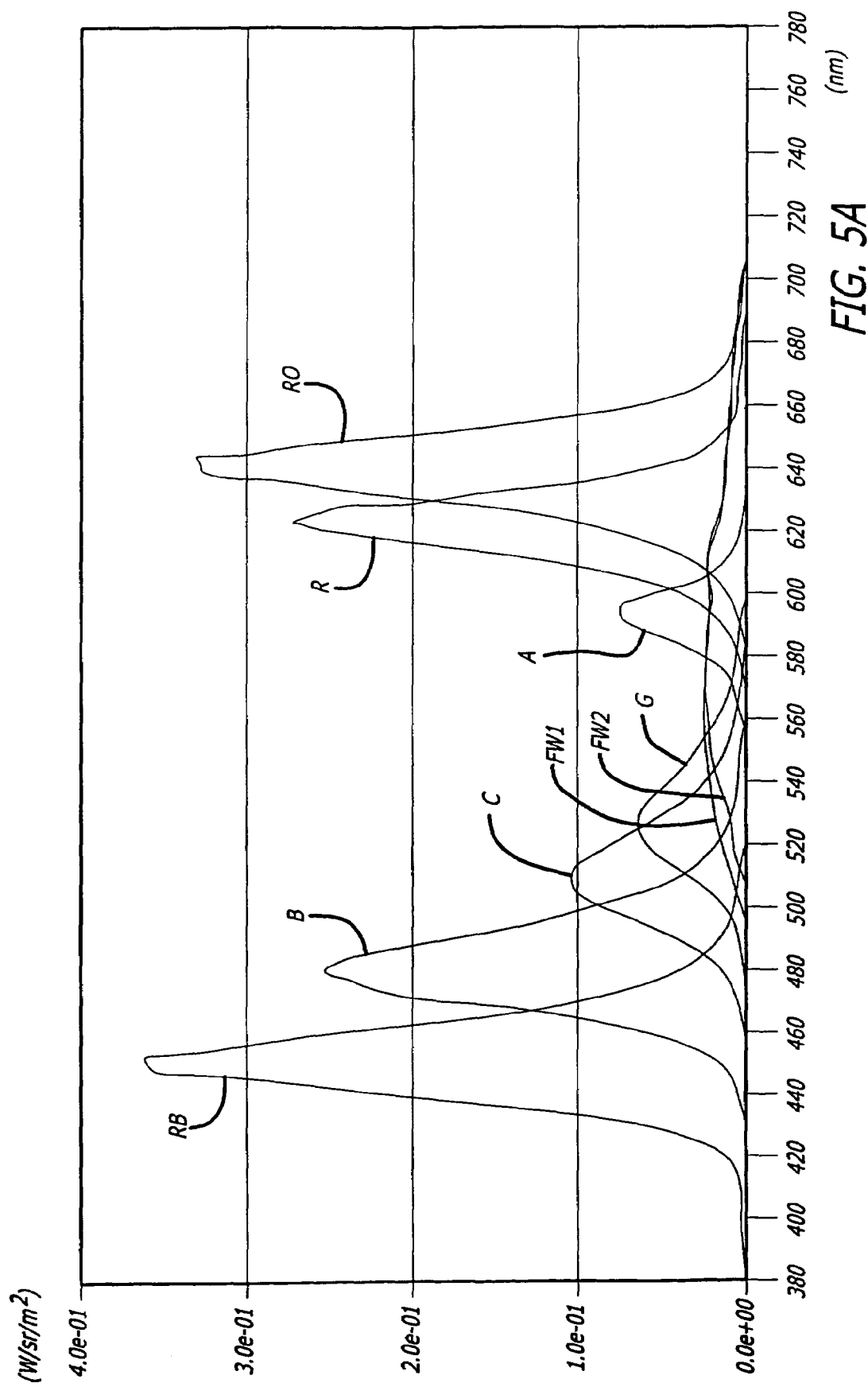
FIG. 5A shows the spectral power distributions of the individual channels of the 9-channel light source.

FIG. 5A shows the spectral power distributions of the individual channels of the 9-channel light source 320 (shown in FIG. 3), progressively ranging from royal blue to red. Each curve plotted in FIG. 5A is labeled with letters indicative of the color channel represented by the curve: RB for royal blue; B for blue; C for cyan; G for green; FW1 for filtered white 1; FW2 for filtered white 2; A for amber; RO for red-orange; and R for red. From FIG. 5A, it is seen that the spectral power distributions are relatively narrow except for the two yellowish channels that are based on filtered white LEDs which have a broader peak.

Figure 5B:
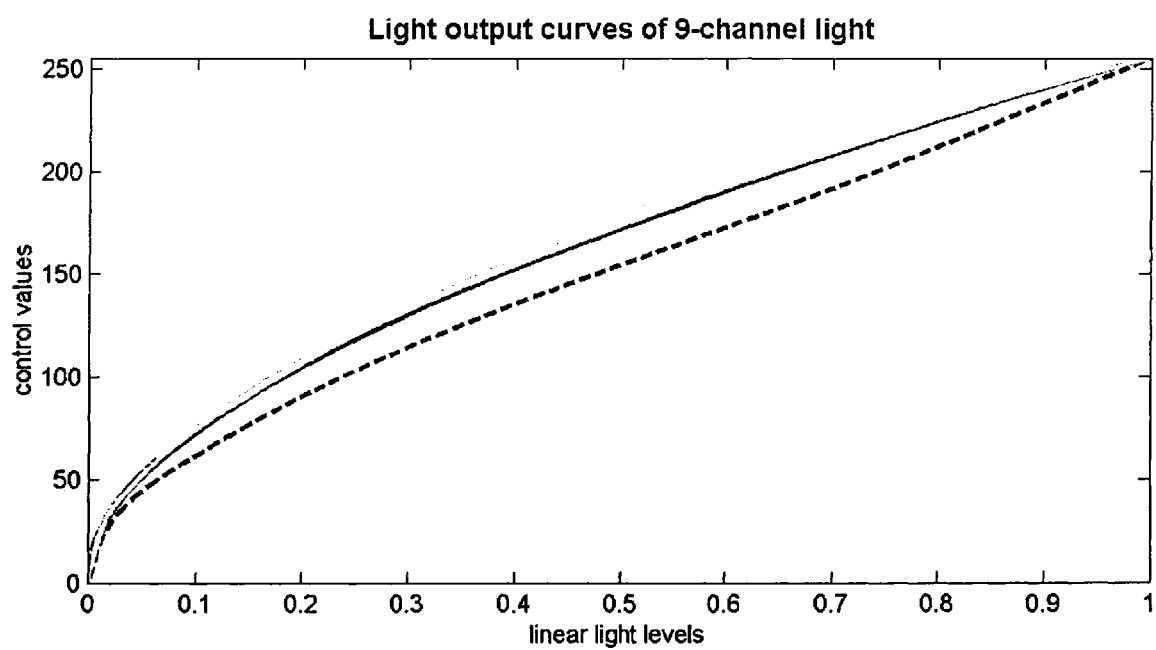
FIG. 5B shows the light output curves of the 9-channel light source.

As for the 3-channel light source, the light output curves for the 9-channel light can also be measured, the results of which are shown in FIG. 5B. Again, FIG. 5B shows that all 9 channels exhibit a nonlinear behavior. In FIG. 5B, the thick, solid upper curve represents a superposition of the light output curves for eight out of the nine color channels, each of the eight curves being very similar to one another so that the eight curves substantially overlap with each other. FIG. 5B shows that all of the 9 channels exhibit a very similar nonlinear behavior except for a single channel, which is shown as a dashed curve separate from all the other curves. The one curve that deviates significantly from the other eight curves belongs to the amber color channel.

Figure 6:
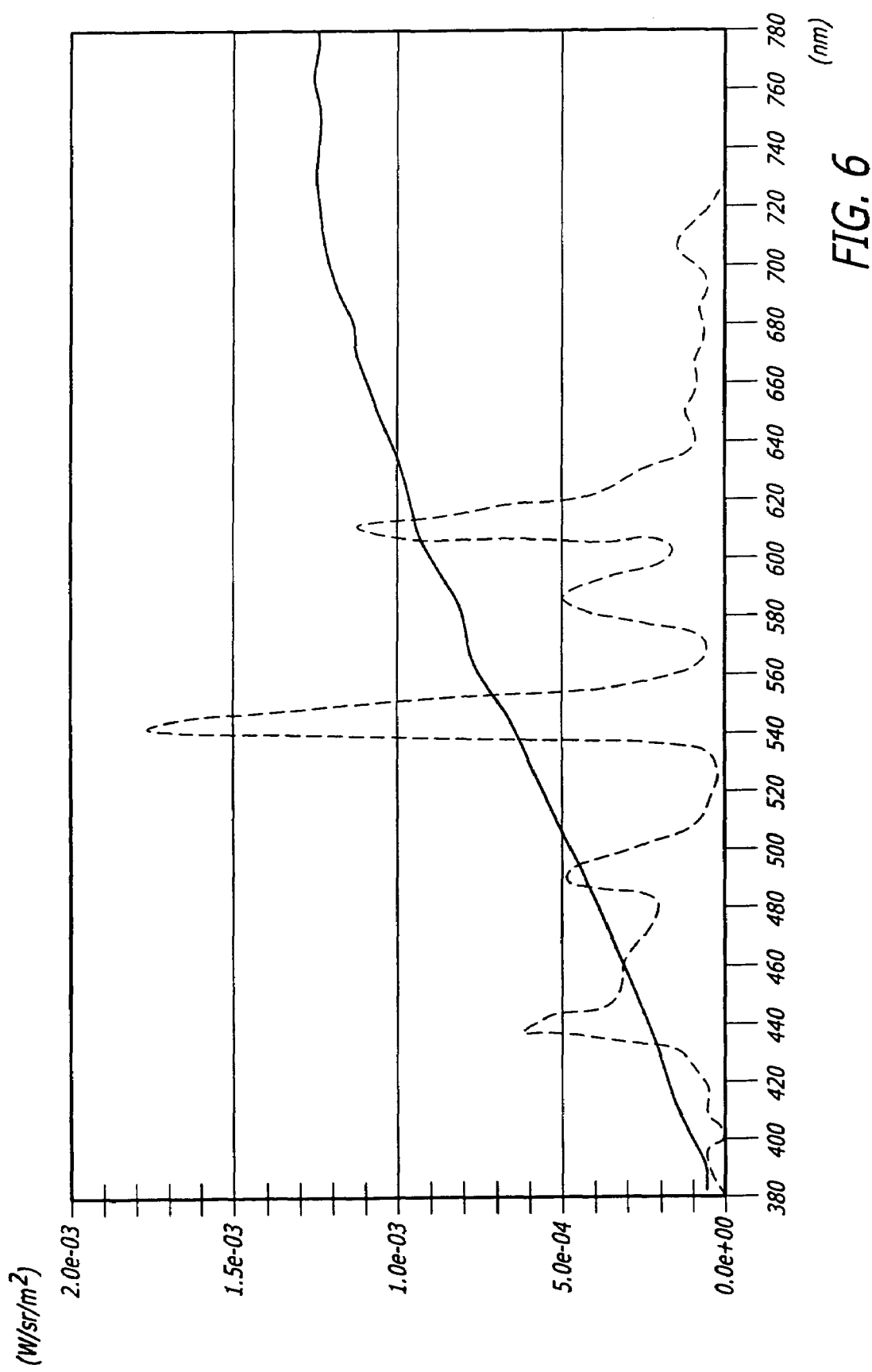
FIG. 6 shows the desired illuminant spectra for tungsten (solid curve) and fluorescent lights (dashed).

FIG. 6 shows the desired illuminant spectra for embodiments in which tungsten (solid curve) and fluorescent light (dashed curve) are used as the desired illuminant. Tungsten exhibits a smooth spectral power distribution, whereas fluorescent light is characterized by a spiky spectral power curve. The desired illuminant spectra represent the real-world illumination spectra, which the lighting reproduction process seeks to match optimally. In other words, the lighting reproduction process seeks to illuminate a subject as it would appear if the subject were illuminated by the desired illuminant, which has a known spectral power distribution. Although the illustrative spectra of only two types of desired illuminants are shown in FIG. 6, it is to be understood that a wide array of other illuminants may be used as the desired illuminants, in other embodiments. These other illuminants may include, but are not limited to: halogen; metal halide; xenon strobe; sodium; and daylight.

Besides the reproduction light source, the other main component of a lighting reproduction apparatus is the optical imaging system. In one exemplary embodiment, the camera system may be a Canon EOS D60 digital SLR camera with an 85 mm Canon EF lens, by way of example, although other embodiments may use a wide variety of different camera systems. In one embodiment, the images may be shot in RAW format in manual mode at ISO 100, with an aperture of f/4. Shutter speed may be varied to produce properly exposed images. The 12 bit per channel RAW files may be converted to floating point images using a raw image converter. The conversion process may take the exposure time $t_{int\ g}$, the nonlinearity of the sensor $\Gamma_k^{c-1}$, and the thermal noise $\epsilon_k$ into account to produce radiometric images from the camera data. The camera may be radiometrically calibrated for its intensity response function $\Gamma_k^c$ and aggregate spectral response function $w_k$, as shown in FIG. 2.

Matching colors for a given camera requires the knowledge of the camera's intensity response and spectral sensitivity. The intensity response curve of the kth channel $\Gamma_k^c$ shows how the camera responds to different light intensity levels. In one embodiment, $\Gamma_k^{c-1}$ can be recovered using a series of differently exposed photographs at $$\frac{1}{3}$$

stop increments of a constant target.

Figure 7A:
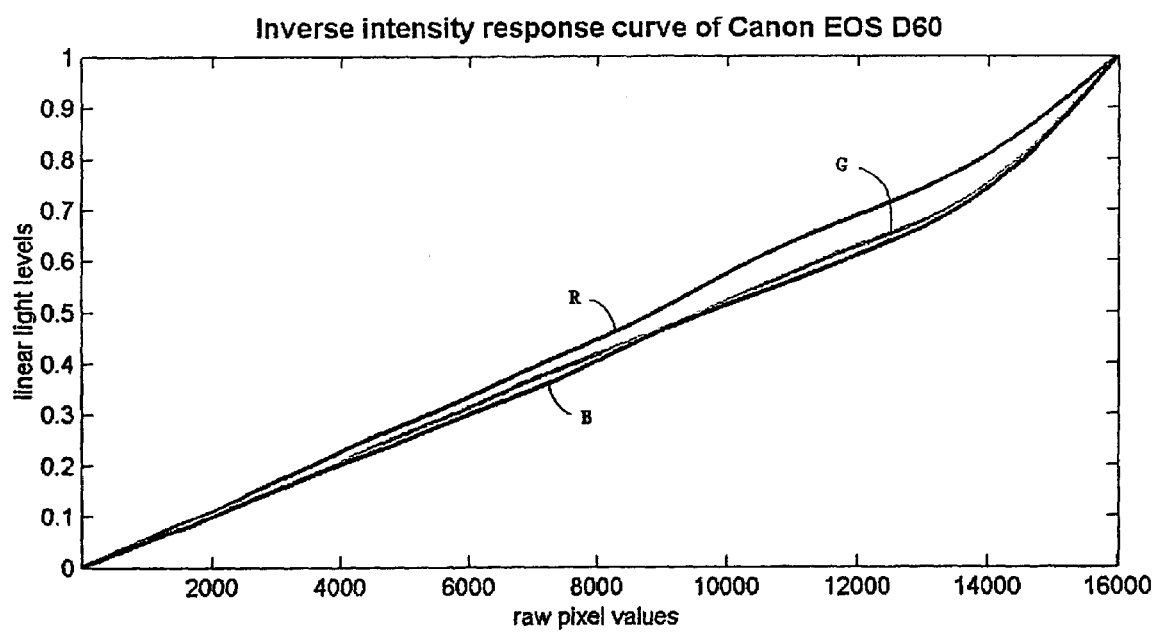
FIG. 7A illustrates the intensity response curves of a digital camera.

Graphing the resulting pixel values against exposure time produces $\Gamma_k^{c-1}$, which specifies how to map pixel values to linear light levels. FIG. 7A illustrates the recovered inverse intensity response curves for the red, green and blue channels of the Canon EOS D60. Each curve in FIG. 7A is labeled by a letter indicative of the color channel represented by the curve (R for red; B for blue; and G for green). The curves are close to linear up to about 80% of the maximum pixel value, at which point non-linearities due to sensor saturation become evident.

Figure 7B:
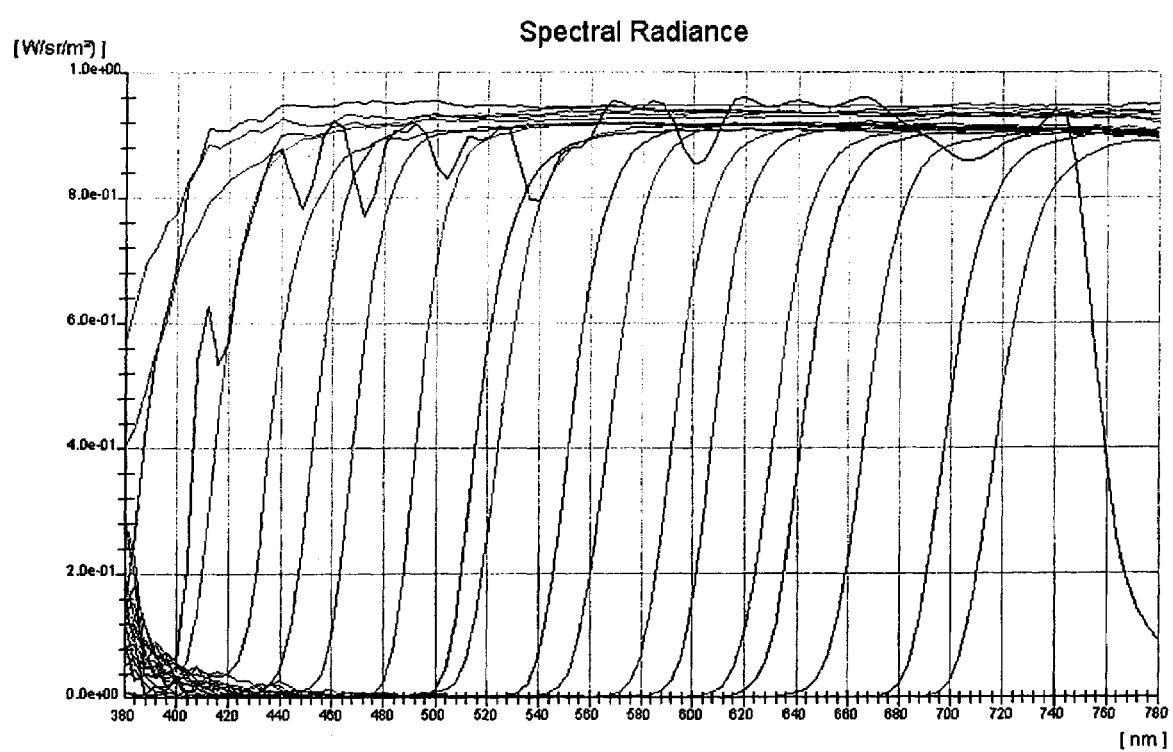
FIG. 7B illustrates the spectra of the color glass filters used to reconstruct the spectral response curves of the digital camera.

The spectral response curves $w_k(\lambda)=o(\lambda)\cdot\phi_k(\lambda)\cdot s(\lambda)$ describe the sensitivity of the camera channels to light of different wavelengths. In one embodiment, it is assumed that the spectral response $w_k(\lambda)$ is constant across the image sensor 270. In one embodiment, the spectral response curve may be recovered by taking a series of photographs with 20 different color glass filters in front of the lens of the camera. FIG. 7B shows the spectral transmissivity of all the different filters. Each curve in FIG. 7B represents the spectral response of a respective one of the 20 different color glass filters. In the illustrated embodiment, 19 Schott color glass longpass filters and a IR cutoff filter from Edmund Optics were used in the spectral response curve re-construction.

In one embodiment, the following system of equations may be inverted, in order to recover the spectral response curve:

$$c_{i,k} = \Gamma_k^c\left(t_{int\ g} \cdot \int_{\lambda_{min}}^{\lambda_{max}} l(\lambda)\cdot r(\lambda)\cdot f_i(\lambda)\cdot w_k(\lambda)\,d\lambda + \epsilon_k\right) \quad (3)$$

For discretely sampled spectra, the above equation can be written in matrix notation:

$$\Gamma_k^{c-1}(\tilde{c}_k)-\epsilon_k = A\cdot w_k \quad (4)$$

In equation (4) above, matrix A holds in its rows the transmittance spectra of the filters $f_i$ modulated by the light source spectrum l and the reflectance spectrum r. Due to the linear dependence in the filter transmittance spectra and the presence of noise in the acquired photographs, the inversion of the system of equations shown in equation (4) above is nontrivial. In one embodiment, the principal eigenvector method, known in the art, may be used to invert the system.

Figure 7C:
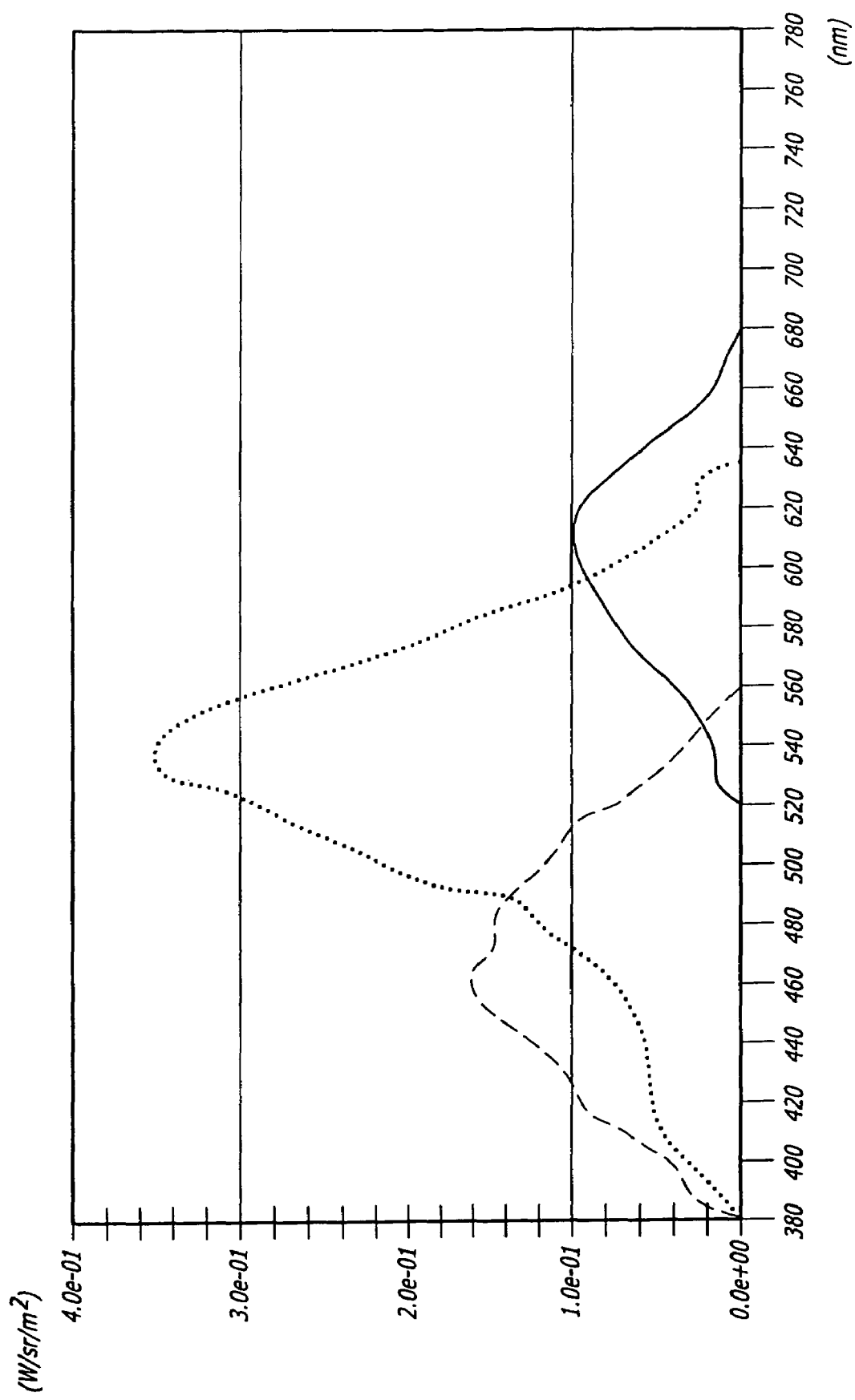
FIG. 7C illustrates the spectral response curves of the digital camera.

FIG. 7C illustrates the spectral response curves of the digital camera. The spectral response curves $w_k$ shown in FIG. 7C were recovered for the Canon EOS D60, using 6 principal eigenvectors. By analogy to FIG. 4A, the red channel for the camera is illustrated as a solid curve; the blue channel for the camera is illustrated as a dashed curve; and the green channel for the camera is illustrated as a dotted curve.

Using the reproduction light source and the camera system described above, a number of techniques may be implemented in order to optimally drive the LED light emitters so that the plurality of LEDs, as a whole, generate a final reproduction light output that most closely achieves the desired lighting reproduction effect. In particular, three different techniques are described for determining light emitter channel intensities that optimally match the effect that the desired illuminant would have on the subject.

Each of the three color matching techniques determine light emitter channel intensities which optimally meet particular criteria, such as that the spectrum of the reproduced light optimally matches the spectrum of the desired illuminant in a least squares sense. Because the light emitter channels cannot be driven with negative values, the light source channel intensities cannot always be determined using linear system techniques. Consequently, a conjugate gradient optimization method is used in one embodiment, the method being modified to enforce positivity in the light emitter color channels to determine which channel intensities optimize the color matching criteria. In another embodiment, a least positive squares technique is used. Other embodiments may use other numerical methods known in the art to determine the channel intensities.

When the desired illuminant (such as a halogen bulb) is much brighter than what the LED light emitters can generate, the techniques match the spectral shape of the curve up to a scale factor, instead of in an absolute sense. This scale factor can be compensated, when needed, by exposing the image using a proportionally longer shutter speed $t_{int\ g}$. The output values of the three color matching techniques described below are linear light channel intensities, which can be mapped to the appropriate light control values using the measured light output curves $\Gamma_k^l$.

A first technique, used in one embodiment, is the SIM method, or the spectral illuminant matching method. This technique is based on the fact that if a spectral match with the desired illuminant is achieved, it is guaranteed that any possible reflectance will look correct for any observer. This approach is attractive since it is not dependent on the spectral response characteristics of the camera system or the subject.

The only information that is needed is data relating to the spectral power distribution of the desired illuminant, and the properties of the reproduction light source.

In this embodiment, the problem of finding the optimal reproduction parameters p (i.e., the weighing parameters for the individual light emitter color channels), given a specific desired illuminant spectrum I, can be formulated as a minimization of the sum of the square residuals of the reproduction light spectra $b_j$ to the desired illuminant spectrum I.

In this embodiment, the data processor 135 in the channel intensity determiner (shown as 130 in FIG. 1) is configured to input and store light emitter data $b_{j,i}$ representative of the spectral power distributions of the individual light emitter color channels that make up the optical source, optical source data $$\sum_j p_j b_{j,i}$$

representative of the spectral power distribution of the final output reproduction light generated by the optical source, and illuminant data $l_i$ representative of the known spectral power distribution of the desired illuminant. The data processor is configured to determine the channel intensity values that produce an optimal spectral match by solving the following minimization equation:

$$\min \sum_i \left( \sum_j p_j b_{j,i} - l_i \right)^2 \Bigg| pj \geq 0 \ \forall \ j \tag{5}$$

where j is the index over the color channels of the reproduction light and i is the index over the spectral samples.

In one embodiment, a conjugate gradient optimization method that is known in the art may be used to solve equation (5) above, and calculate the light output levels of the individual color channels, with only minor modifications. For example, a simple check may be added to the original algorithm, which determines whether one of the optimization parameters violates the constraint that none of the light output levels can take on a negative value, and determines the appropriate action to follow in case a violation occurs. Following is an exemplary pseudo-code, which may be used in one embodiment to solve a minimization equation such as equation (5) above.

assumption: all initial optimization parameters p_i>0

```
ITMAX = 200;
fp = func(p); // calculate the functions value at p
xi = dfunc(p); // calculate the gradient at p
initialize the conjugate gradients h = g = -xi
for its < ITMAX
{
    // perform line minimization along xi starting at p
    linmin(p, xi, fret, func);
    if minimum reached
        return;
    fp = fret;
    // if constraint violated with optimization parameters p
    if there is a p_i < 0
    {
        - step back onto the constraint boundary along the conjugate
        gradient such that p_i >= 0 for all i
        xi = dfunc(p);
        - make sure the gradient xi at the new p doesn't immediately
        violate the constraint again:
            if -xi_i < 0 where p_i = 0 for all i
                xi_i = 0
        - reinitialize the conjugate gradients h = g = -xi
    }
    else
    {
        // do regular conjugate gradient
        xi = dfunc(p);
        calculate gamma according to Polak-Ribiere
        update the conjugate gradients
        g = -xi;
        xi = h = g + gamma * h;
    }
}
```

Determining optimal parameters p for equation (5) above, with the constrained optimization solver, yields results such as the dotted curves in FIGS. 8A-8D, for matching tungsten and fluorescent illuminant spectra. FIGS. 8A-8D illustrates the spectral power distributions obtained using the SIM method described above, as compared to the spectral power distribution of the desired illuminant (shown as a solid black curve and labeled with reference numeral 300 in FIGS. 8A-8D), and as compared to the spectral power distribution resulting from the MIM and MRM methods described below.

Figure 8A:
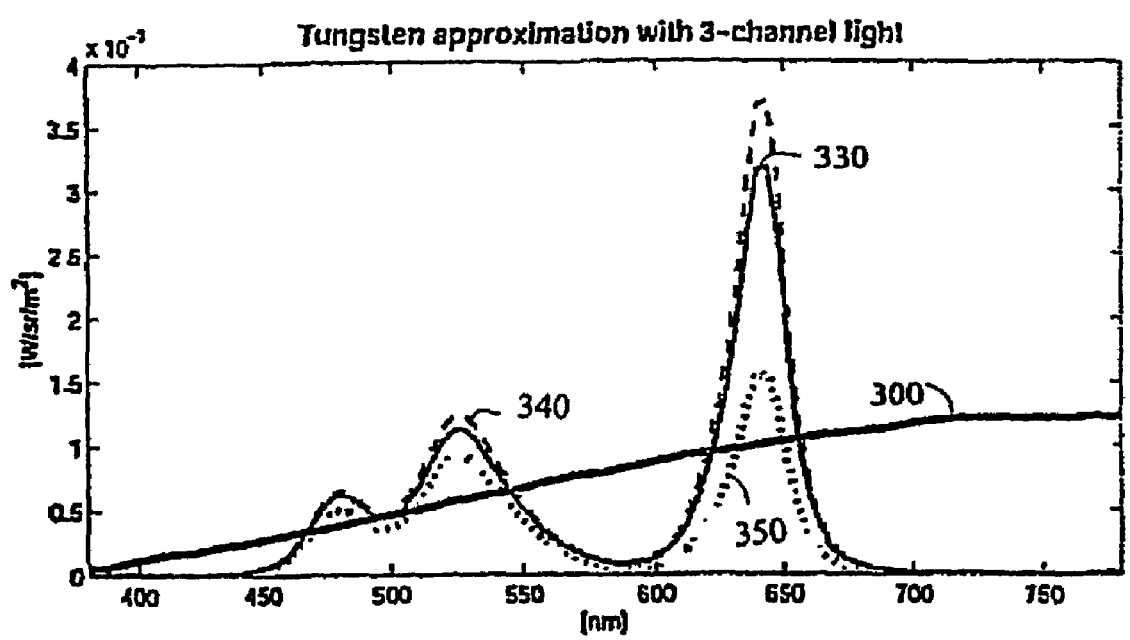
FIGS. 8A-8D illustrate the spectral power distributions obtained using the SIM (Spectral Illuminant Matching), MIM (Metameric Illuminant Matching) and MRM (Metameric Reflectance Matching) methods, respectively, as compared to the spectral power distribution of the desired illuminant.
Figure 8B:
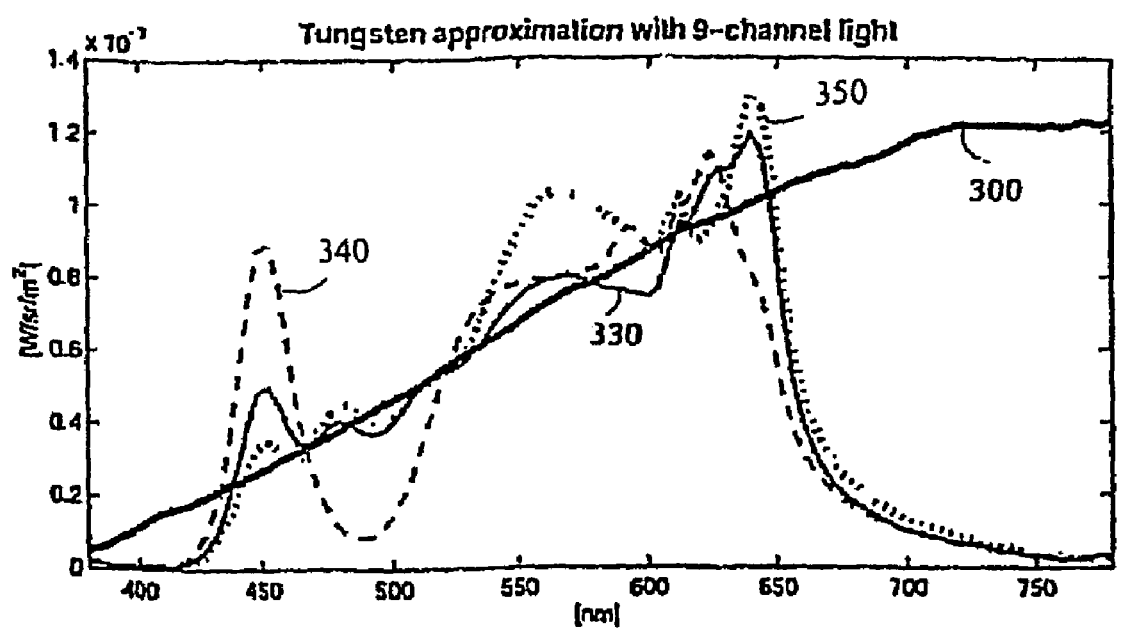
Figure 8C:
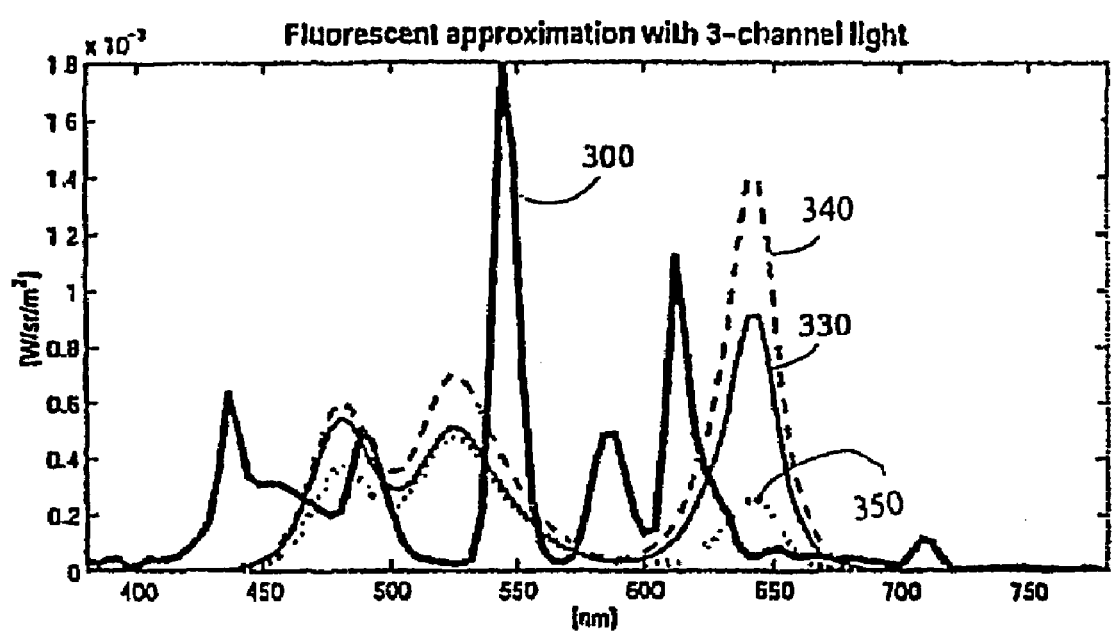
Figure 8D:
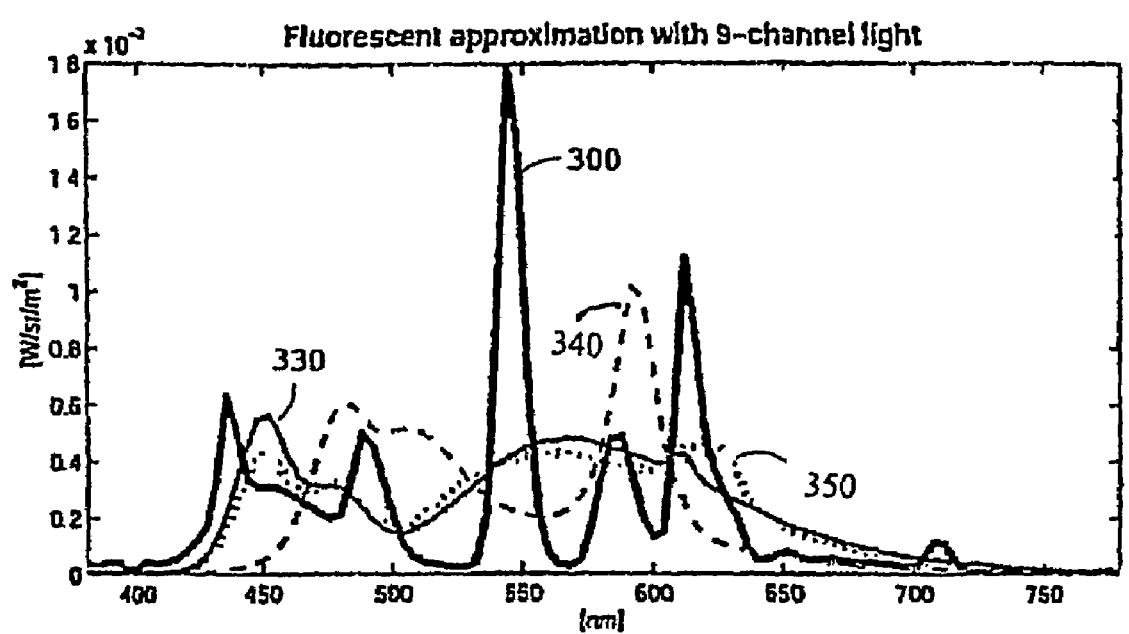

In FIGS. 8A-8D, the spectral power distribution of the desired illuminant is shown as a solid black curve and labeled with reference numeral 300. In FIG. 8A, a 3-channel light source is used, and tungsten is used as the desired illuminant. In FIG. 8B, a 9-channel light source is used, and tungsten is used as the desired illuminant. In FIG. 8C, a 3-channel light source is used, and fluorescent light is used as the desired illuminant. In FIG. 8D, a 9-channel light source is used, and fluorescent light is used as the desired illuminant.

In FIGS. 8A-8D the spectral power distributions resulting from the SIM method is illustrated as a dotted curve, and is labeled with reference numeral 350. As the dotted curves in FIGS. 8A-8D show, a very close spectral match with the target lighting cannot be achieved, using a limited number of channels. This mismatch can lead to errors in the lighting reproduction process, and motivates the MIM technique.

The MIM technique, used in one embodiment, leverages knowledge of the spectral response curves of the camera system to improve lighting reproduction, given that it is not possible to directly match the spectrum of the desired illuminant very closely. The idea is to match the output of the reproduction light $\Sigma_j p_j b_j$ metamerically to the desired illuminant I, with respect to a particular camera's spectral response curves $w_k$.

In an embodiment in which the MIM technique is used, the problem of determining the optimal parameters $p_j$ for the light emitter channel intensities can be formulated as a minimization of the sum of the square residuals of the reproduction light color channels as observed by the camera system, the data relating to which may be stored by the data processor 135 (shown in FIG. 1) in the form $\Sigma_i w_{k,i} \Sigma_j p_j b_{j,i}$, to the desired illuminant as observed by the camera system, the data relating to which may be stored by the data process 135 in the form $\Sigma w_{k,i} l_i$.

In this embodiment, the minimization equation that is solved by the data processor 135 in the channel intensity determiner 130 may be given by:

$$\min \sum_{k} \left( \sum_{i} w_{k,i} \sum_{j} p_j b_{j,i} - \sum_{i} l_i w_{k,i} \right)^2 \bigg| pj \geq 0 \, \forall \, j \quad (6)$$

where j is the index over the color channels of the reproduction light, i is the index over the spectral samples, and k denotes the index over the color channels of the camera system. The conjugate gradient optimization method, described above, may be used by the data processor 135 to solve equation (6) above.

In FIGS. 8A-8D, the dashed curves (labeled with reference numeral 340) show results obtained by using the MIM method to achieve a color match for the tungsten and the fluorescent light sources with respect to the Canon EOS D60's response curves. While the spectra do not match any more closely, the appearance of the original and reproduced illuminants to the camera system are matched as closely as possible.

The third and final MRM technique, used in one embodiment, improves on the lighting reproduction quality of the MIM method by additionally taking into account the spectral reflectances of the subject. If one knows the observer's spectral response curve, one only needs to generate light that produces a metamer for the observer, and there is no need to actually reproduce the spectrum of either the incident or reflected light. In this embodiment, the dominant reflectances of the subject are used to derive the intensity for the individual channels of the light source, to produce such a metameric color match. By measuring key spectral reflectances $r_n$ of the subject, and using these key spectral reflectances as a part of the optimization, it is possible to specifically aim to match the appearance of the subject under the reproduced illumination, to its appearance under the desired illumination, again with respect to the spectral responses of the given camera system $w_k$.

In this embodiment, the minimization equation for determining the optical channel intensity values can be formulated as the sum of square relative differences between the key spectra $r_n$ illuminated with the target light spectrum I observed by the camera system described by $w_k$, and the key spectra $r_n$ illuminated with the reproduction light spectra $\Sigma_j p_j b_j$ observed by $w_k$:

$$\min \sum_{n} \sum_{k} \left( \frac{\sum_{i} r_{n,i} w_{k,i} \sum_{j} p_j b_{j,i} - \sum_{i} r_{n,i} l_i w_{k,i}}{\sum_{i} r_{n,i} w_{k,i}} \right)^2 \bigg| pj \geq 0 \, \forall \, j, \quad (7)$$

where i, j and k are indices over the same domain as in the SIM and MIM methods described above, and n denotes the index over the number of measured key reflectances. In this embodiment, the data processor 135 stores the illuminant data as $l_i$, the light emitter data as $b_{j,i}$, the spectral response data as $w_{k,i}$, the channel intensity values as $p_j$, the spectral reflectance data as $r_n$, the image data (representative of the spectral power distribution of light from the optical source as reflected by the subject and observed by the camera) as $\Sigma_i r_{n,i} w_{k,i} \Sigma_j p_j b_{j,i}$, and the illuminant observation data (representative of the know spectral power distribution of the desired illuminant, as observed by the camera), as $\Sigma w_{k,i} l_i$.

In FIGS. 8A-8D, the solid curves, labeled with reference numeral 330, show the results of the metameric reflectance matching method. In particular, the solid curves 330 are the result of optimizing the illuminated appearance of all the color swatches on the Macbeth Color Checker chart for tungsten and fluorescent illumination. The conjugate gradient optimization method, described above, may be used by the data processor 135 to solve equation (7) above.

FIGS. 8A-8D show that, in general, the 9-channel light performs better than the RGB light, which is expected since it provides more degrees of freedom to achieve the color matching. For the SIM method in particular, a large discrepancy is seen between the performance of the 3-channel RGB light source, as compared to the 9-channel light source. This is not surprising, since the 9-channel light source provides much more variability for spectrally matching illuminants.

FIGS. 8A-8D also show that the SIM method yields the poorest results, compared to the MIM method and the MRM method, most strikingly for the RGB light, but also for the 9-channel light. An explanation for this result may be found by examining the curves in FIGS. 8A-8D. Looking at the spectral power distribution produced by the SIM method with respect to the spectral power distribution of the MIM method, a significant difference can be observed in light output, particularly in the red region of the spectrum for the 3-channel light which leads to a blueish-green tint. Overall, the MIM and the MRM methods provide improved matches, for both the 3-channel and the 9-channel reproduction lights.

In particular, the color matching results appear to improve for the 3-channel light source, as more information is taken into account. For the 3-channel light, there appears to be a significant improvement from the very poorly performing SIM method to the MIM method, and a noticeable improvement form the MIM method to the MRM method. For the 9-channel light source, it is harder to make out a clear order of the performances. With the 9-channel light source, the SIM method seems to perform slightly worse than the MIM and MRM methods, and the actual image had a noticeable greenish tint. The MIM and MRM methods performed very similarly, for a 9-channel light source.

While the color matching apparatus and method have been described and shown with reference to specific embodiments, it should be understood by those skilled in the art that various changes in form and detail may be made therein. Many other embodiments are possible.

Other embodiments are within the following claims.

What is claimed is:

1. A lighting reproduction apparatus for illuminating a subject while achieving metameric illuminant matching (MIM) so that the illuminated subject, when observed by an optical imaging system, substantially appears to be illuminated by a desired illuminant having a known spectral power distribution, the apparatus comprising:

an optical source configured to generate light that illuminates the subject, the optical source comprising a plurality of light emitters, each light emitter characterized by an individual color channel having an associated spectral power distribution;

an optical imaging system configured to detect light that is reflected from the subject illuminated with the light from the optical source, and to generate therefrom image data representative of the intensity of the detected light according to at least one a spectral response function, each spectral response function corresponding to one color channel of the optical imaging system; and a driver configured to drive the individual color channels of each light emitter with non-negative channel intensity values at which a substantial match is achieved between the imaging system response of the emitted light, and the predicted imaging system response of the desired illuminant, the driver comprising a channel intensity determiner configured to compute the non-negative channel intensity values, the channel intensity determiner including a data processor configured to input and store the image data, and illuminant observation data representative of the known spectral power distribution of the desired illuminant as observed by the optical imaging system.

2. A lighting reproduction apparatus in accordance with claim 1, wherein the data processor is further configured to input and store:
   a) light emitter data representative of the associated spectral power distributions of the light emitter color channels;
   b) spectral response data representative of the at least one spectral response function of the optical imaging system; and
   c) illuminant data representative of the known spectral power distribution of the desired illuminant.

3. A lighting reproduction apparatus in accordance with claim 2,
   wherein the data processor is configured to input and store the image data in the form of a product of the light emitter data, the channel intensity values, and the spectral response data;
   wherein the data processor is configured to input and store the illuminant observation data in the form of a product of the illuminant data and the spectral response data; and
   wherein the data processor is configured to compute the desired channel intensity values by minimizing a sum of square residuals of the image data to the illuminant observation data.

4. A lighting reproduction apparatus in accordance with claim 3, wherein the data processor is configured to store the illuminant data as $l_i$, the light emitter data as $b_{j,i}$, the spectral response data as $w_{k,i}$, and the channel intensity values as $p_j$; and
   wherein the data processor is configured to store the image data as $\Sigma_i w_{k,i} \Sigma_j p_j b_{j,i}$, and the illuminant observation data as $\Sigma w_{k,i} l_i$
   where
   the index i represents the i-th spectral frequency of the sampled desired illuminant spectrum;
   the index j represents the j-th light emitter color channel; and
   the index k represents the k-th color channel of the optical imaging system.

5. A lighting reproduction apparatus in accordance with claim 4, wherein the data processor is configured to compute the channel intensity values by numerically solving a minimization equation whose mathematical expression comprises:

$$\min \sum_k \left( \sum_i w_{k,i} \sum_j p_j b_{j,i} - \sum_i l_i w_{k,i} \right)^2,$$

and which is constrained by the condition that the channel intensity values $p_j$ be non-negative.

6. A lighting reproduction apparatus in accordance with claim 5, wherein the data processor is configured to numerically solve the minimization equation using a constant gradient optimization method.

7. A lighting reproduction apparatus in accordance with claim 2, wherein optical imaging system comprises:
   an optics subsystem including one or more optical components, the optics subsystem characterized by a spectral response function $o(\lambda)$,
   a filter subsystem including one or more filters, the k-th filter of the filter subsystem being characterized by a spectral transmittance function $\phi_k(\lambda)$, and
   a sensor subsystem including one or more imaging sensors, the sensor subsystem characterized by a spectral sensitivity function $s(\lambda)$;
where $\lambda$ represents the wavelength of light incident on the optical component.

8. A lighting reproduction apparatus in accordance with claim 7, wherein the data processor is configured to store the spectral response function $w_k(\lambda)$ of the k-th color channel of the optical imaging system as $$w_{k(\lambda)} = o(\lambda) \times \phi_k(\lambda) \times s(\lambda).$$

9. A lighting reproduction apparatus in accordance with claim 8, wherein at least some of the imaging sensors are characterized by a nonlinear response.

10. A lighting reproduction apparatus in accordance with claim 9,
   wherein a mathematical expression that models said nonlinear response of the at least some imaging sensors comprises:

$$\check{c}_k = \Gamma_k^c \left( t_{int\,g} \cdot \int_{\lambda_{min}}^{\lambda_{max}} l(\lambda) \cdot r(\lambda) \cdot o(\lambda) \cdot \phi_k(\lambda) \cdot s(\lambda) d\lambda + \varepsilon_k \right)$$

$$c_k = \Gamma_k^{c-1}(\check{c}_k)$$

where $\Gamma_k^c$ is a function representing the nonlinear response of the k-th color channel of the optical imaging system;
   $\check{c}_k$ represents a nonlinear pixel value; and
   $c_k$ represents a linear pixel value.

11. A lighting reproduction apparatus in accordance with claim 7,
   wherein the optical components comprise one or more of:
   a lens; a prism; an optical reflector; an optical refracter; an optical scatterer; an optical
   splitter; and a collimator.

12. A lighting reproduction apparatus in accordance with claim 1, wherein the desired illuminant comprises at least one of a tungsten source and a fluorescent source.

13. A lighting reproduction apparatus in accordance with claim 1 wherein the light emitters comprise LEDs (light emitting diodes).

14. A lighting reproduction apparatus in accordance with claim 1, wherein the light emitters comprise filtered incandescent light sources.

15. A lighting reproduction apparatus in accordance with claim 1, wherein the optical imaging system comprises a digital camera.

16. A lighting reproduction apparatus in accordance with claim 1, wherein the optical source comprises a multi-spectral optical source, and wherein the individual color channels of the light emitters comprise at least three different color channels, the at least three different color channels comprise the red, blue, and green color channels.

17. A lighting reproduction apparatus in accordance with claim 1, wherein the optical source comprises a multi-spectral optical source, and wherein the individual color channels of the light emitters comprise more than three different color channels.

18. A lighting reproduction apparatus in accordance with claim 1, the more than three different color channels comprise: royal blue; blue; cyan; green; amber; red-orange; red; white with a first filter; and white with a second filter.

19. A lighting reproduction apparatus in accordance with claim 1, wherein the optical imaging system comprises a human visual system comprising a human retina having a plurality of light-sensitive cells, each cell characterized by an associated spectral response function.

20. A lighting reproduction apparatus in accordance with claim 1, wherein the desired illuminant comprises at least one of: a halogen; a metal halide; a xenon strobe; sodium; and daylight.

21. A lighting reproduction apparatus for illuminating a subject in a way that the illuminated subject substantially appears to be illuminated by a desired illuminant having a known spectral power distribution, so that spectral illuminant matching (SIM) is achieved, the lighting reproduction apparatus comprising:
an optical source configured to generate light that illuminates the subject and that is detected by a viewer, the optical source comprising a plurality of light emitters, each light emitter characterized by an individual color channel having an associated spectral power distribution; and
a driver configured to drive the light emitter color channels at non-negative channel intensity values for which the spectral power distribution of the emitted light substantially matches the known spectral power distribution of the desired illuminant, so that color matching is achieved for the viewer by the lighting reproduction apparatus;
wherein the driver comprises a channel intensity determiner configured to compute the non-negative channel intensity values in accordance with a mathematical metric that provides for an optimal match between the spectrum of the optical source and the spectrum of the desired illuminant; and
wherein the channel intensity determiner includes a data processor configured to input and store light emitter data representative of the associated spectral power distributions of the light emitter color channels, optical source data representative of the spectral power distribution of the light generated by the optical source, and illuminant data representative of the known spectral power distribution of the desired illuminant.

22. A lighting reproduction apparatus in accordance with claim 21, wherein the data processor is configured to store the illuminant data as $l_i$, the light emitter data as $b_{j,i}$, the channel intensity values as $p_j$, and $$\sum_j p_j b_{j,i}$$

where the index i represents the i-th spectral frequency of the sampled desired illuminant spectrum; and
the index j represents the j-th light emitter color channel.

23. A lighting reproduction apparatus in accordance with claim 22, wherein the data processor is configured to compute the channel intensity values by numerically solving a minimization equation whose mathematical expression comprises:

$$\min \sum_i \left( \sum_j p_j b_{j,i} - l_i \right)^2$$

and which is constrained by the condition that the channel intensity values $p_j$ be non-negative.

24. A lighting reproduction apparatus for illuminating a subject while achieving spectral illuminant matching (SIM) type color matching, the lighting reproduction apparatus comprising:
a multi-spectral optical source configured to generate reproduction light that illuminates the subject, the optical source comprising a plurality of light emitters, each light emitter characterized by an individual color channel having an associated spectral power distribution; and
a driver configured to drive the light emitter color channels with non-negative channel intensity values that cause a spectral match between the spectral power distribution of the reproduction light generated by the optical source, and a known spectral power distribution of a desired illuminant;
wherein the light emitters comprise more than three different color channels.

25. A lighting reproduction apparatus for illuminating a subject while achieving metameric reflectance matching (MRM) type color matching so that the illuminated subject, when observed by an optical imaging system, appears to be illuminated by a desired illuminant having a known spectral power distribution, the subject being characterized by one or more spectral reflectances, the apparatus comprising:
an optical source configured to generate light that illuminates the subject, the optical source comprising a plurality of light emitters, each light emitter characterized by an individual color channel having an associated spectral power distribution;
an optical imaging system characterized by at least one spectral response function and configured to detect light that is reflected from the subject illuminated with the light from the optical source, and to generate therefrom image data representative of intensity of the detected light according to each spectral response function;
a driver configured to drive the light emitter color channels with non-negative channel intensity values at which a substantial match is achieved between the optical imaging system response of the detected light, and the predicted optical imaging system response of the desired illuminant reflected from spectral reflectances of the subject and observed by the optical imaging system, so that metameric color matching is achieved when the illuminated subject is observed by the optical imaging system.

26. A lighting reproduction apparatus in accordance with claim 25, wherein the driver comprises a channel intensity determiner configured to compute the light emitter channel intensity values, the channel intensity determiner including a data processor configured to input and store:
a) light emitter data $b_{ji}$ representative of the associated spectral power distributions of the light emitter color channels;
b) spectral response data $w_{ki}$ representative of the at least one spectral response function of the optical imaging system; and
c) spectral reflectance data $r_n$ representative of the spectral reflectances of the subject;

d) illuminant data $l_i$ representative of the known spectral power distribution of the desired illuminant;
e) optical source data $$\sum_j p_j b_{j,i}$$

representative of the spectral power distribution of the light generated by the optical source;
f) the image data $\Sigma_i r_{n,i} w_{k,i} \Sigma_j p_j b_{j,i}$ from the optical imaging system, representative of the spectral power distribution of the known spectral reflectances $r_n$ when illuminated with the light from the optical source and observed by the optical imaging system having a spectral response $w_k$; and
g) illuminant observation data $\Sigma_i r_{n,i} l_i w_{k,i}$ representative of the spectral power distribution of the spectral reflectances $r_n$ when illuminated with the desired illuminant and observed by the optical imaging system having a spectral response $w_k$.

27. A lighting reproduction apparatus in accordance with claim 26, wherein the data processor is configured to compute the channel intensity values by numerically solving a minimization equation whose mathematical expression comprises:

$$\min \sum_n \sum_k \left( \frac{\sum_i r_{n,i} w_{k,i} \sum_j p_j b_{j,i} - \sum_i r_{n,i} l_i w_{k,i}}{\sum_i r_{n,i} w_{k,i}} \right)^2 \Bigg| \, p_j \geq 0 \, \forall \, j$$

the equation being constrained by the condition that the channel intensity values $p_j$ be non-negative,
wherein
the index i represents the i-th spectral frequency of the sampled desired illuminant spectrum;
the index j represents the j-th light emitter color channel; and
the index k represents the k-th color channel of the optical imaging system, and
the index n represents the n-th spectral reflectance of the subject.

28. A lighting reproduction apparatus for illuminating a subject while achieving metameric illuminant matching (MIM), the lighting reproduction apparatus comprising:
an optical source configured to generate light that illuminates the subject, the optical source comprising a plurality of light emitters, each light emitter characterized by an individual color channel having an associated spectral power distribution;
means for detecting light that is reflected from the subject and illuminated with the light from the optical source, and for generating therefrom image data representative of a spectral power distribution of the detected light; and
driving means for driving the light emitter color channels with non-negative channel intensity values at which a match is achieved between the imaging system response of the detected light, and the imaging system response of a desired illuminant as detected by the means for detecting light reflected from the subject, so that metameric illuminant matching is achieved when the illuminated subject is observed by the means for detecting reflected light.

29. A method of illuminating a subject with light from an optical source while achieving metameric illuminant matching (MIM) type color matching so that the illuminated subject, when observed by an optical imaging system, appears to be illuminated by a desired illuminant having a known spectral power distribution, the optical source having a plurality of light emitters, each light emitter characterized by an individual color channel, the method comprising:
obtaining spectral response data representative of the spectral response of the optical imaging system, light emitter data representative of the spectral power distributions of the individual color channels of the plurality of light emitters, and illuminant data representative of the known spectral power distribution of the desired illuminant;
generating from the spectral response data, light emitter data, and illuminant data, non-negative channel intensity values of the individual color channels of the plurality of light emitters at which a match occurs between the imaging system response of the light from the plurality of light emitters, as observed by the optical imaging system, and the predicted imaging system response of the desired illuminant, as observed by the optical imaging system;
and
illuminating the subject by driving the plurality of color channels of light emitters at the non-negative channel intensity values so that metameric illuminant matching is achieved when the illuminated subject is observed by the optical imaging system.

30. A method in accordance with claim 29, wherein the act of generating the channel intensity values comprises solving a minimization equation, the mathematical expression for which comprises:

$$\min \sum_k \left( \sum_i w_{k,i} \sum_j p_j b_{j,i} - \sum_i l_i w_{k,i} \right)^2,$$

wherein $l_i$ represent the illuminant data, $b_{j,i}$ represent the light emitter data, $W_{k,i}$ represent the spectral response data, and $p_j$ represent the channel intensity values;
where
the index i represents the i-th spectral frequency of the sampled desired illuminant spectrum;
the index j represents the j-th light emitter color channel; and
the index k represents the k-th color channel of the optical imaging system; and
wherein the minimization equation is constrained by the condition that the channel intensity values $p_j$ be non-negative.

31. A method of illuminating a subject with light from an optical source while achieving spectral illuminant matching (SIM) type color matching so that the illuminated subject substantially appears to be illuminated by a desired illuminant having a known spectral power distribution, the optical source having a plurality of light emitters, each light emitter characterized by an individual color channel, the method comprising:
obtaining light emitter data representative of the spectral power distributions of the individual color channels of the plurality of light emitters, and illuminant data representative of the known spectral power distribution of the desired illuminant;

generating from the light emitter data and the illuminant data, non-negative channel intensity values of the individual color channels of the plurality of light emitters at which a substantial match occurs between the spectral power distribution of the light from the plurality of light emitters, and the known spectral power distribution of the desired illuminant; and illuminating the subject by driving the plurality of color channels of light emitters at the non-negative channel intensity values so that spectral illuminant matching is achieved.

32. A method in accordance with claim 31, wherein the act of generating the channel intensity values comprises solving a minimization equation, the mathematical expression for which comprises:

$$\min \sum_i \left( \sum_j p_j b_{j,i} - l_i \right)^2 \bigg| pj \geq 0 \forall j$$

wherein $l_i$ represent the illuminant data, $b_{ji}$ represent the light emitter data, and $p_j$ represent the channel intensity values;

wherein the index i represents the i-th spectral frequency of the sampled desired illuminant spectrum; and wherein the index j represents the j-th light emitter color channel.

33. A method in accordance with claim 32, wherein the individual color channels of the light emitters comprise nine different color channels.

34. A method of illuminating a subject with light from an optical source while achieving metameric reflectance matching (MRM) type color matching so that the illuminated subject, when observed by an optical imaging system, substantially appears to be illuminated by a desired illuminant having a known spectral power distribution, the subject being characterized by one or more spectral reflectances, the optical source having a plurality of light emitters, each light emitter characterized by an individual color channel, the method comprising:

obtaining spectral response data representative of the spectral response of the optical imaging system, light emitter data representative of the spectral power distributions of the individual color channels of a plurality of light emitters, spectral reflectance data representative of the known spectral reflectances of the subject, and illuminant data representative of the spectral power distribution of the desired illuminant;

generating from the spectral response data, light emitter data, spectral reflectance data, and desired illuminant data, non-negative channel intensity values of the individual color channels of the plurality of light emitters at which a substantial match occurs between the imaging system response of reflection of the plurality of light emitters from the spectral reflectances of the subject, as observed by the optical imaging system, and the imaging system response of the desired illuminant's reflection from the spectral reflectances of the subject, as observed by the optical imaging system;

and illuminating the subject by driving the plurality of color channels of light emitters at the non-negative channel intensity values so that metameric reflectance matching is achieved when the illuminated subject is observed by the optical imaging system.

35. A method in accordance with claim 34, wherein the act of generating the channel intensity values comprises solving a minimization equation, the mathematical expression for which comprises:

$$\min \sum_n \sum_k \left( \frac{\sum_i r_{n,i} w_{k,i} \sum_j p_j b_{j,i} - \sum_i r_{n,i} l_i w_{k,i}}{\sum_i r_{n,i} w_{k,i}} \right)^2 \bigg| pj \geq 0 \forall j$$

the minimization equation being constrained by the condition that the channel intensity values $p_j$ be non-negative;

wherein $l_i$ represent the illuminant data, $b_{ji}$ represent the light emitter data, $w_{ki}$ represent the spectral response data, and $p_j$ represent the channel intensity values; $r_n$ represent the known spectral reflectances;

and wherein the index i represents the i-th spectral frequency of the sampled desired illuminant spectrum;

the index j represents the j-th light emitter color channel; and the index k represents the k-th color channel of the optical imaging system, and the index n represents the n-th spectral reflectance of the subject.

* * * * *